(12) United States Patent
Kaneko et al.

(10) Patent No.: US 11,538,241 B2
(45) Date of Patent: Dec. 27, 2022

(54) POSITION ESTIMATING DEVICE

(71) Applicant: Hitachi Automotive Systems, Ltd., Hitachinaka (JP)

(72) Inventors: Alex Masuo Kaneko, Tokyo (JP); Kenjiro Yamamoto, Tokyo (JP); Shigenori Hayase, Ibaraki (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 106 days.

(21) Appl. No.: 17/049,656

(22) PCT Filed: Mar. 29, 2019

(86) PCT No.: PCT/JP2019/013964
§ 371 (c)(1),
(2) Date: Oct. 22, 2020

(87) PCT Pub. No.: WO2019/208101
PCT Pub. Date: Oct. 31, 2019

(65) Prior Publication Data
US 2021/0256260 A1 Aug. 19, 2021

(30) Foreign Application Priority Data
Apr. 27, 2018 (JP) .............................. JP2018-087826

(51) Int. Cl.
*G06V 20/20* (2022.01)
*G06K 9/62* (2022.01)
*G06V 20/13* (2022.01)
(52) U.S. Cl.
CPC ........... *G06V 20/20* (2022.01); *G06K 9/6232* (2013.01); *G06V 20/13* (2022.01)
(58) Field of Classification Search
None
See application file for complete search history.

(56) References Cited

U.S. PATENT DOCUMENTS 9,802,317 B1 * 10/2017 Watts ................... G05B 19/402
10,719,966 B1 * 7/2020 Davis ..................... G06Q 40/08
(Continued)

FOREIGN PATENT DOCUMENTS

JP 2000-090393 A 3/2000
JP 2005-326168 A 11/2005
(Continued)

OTHER PUBLICATIONS

Xu et al., "3D Point Cloud Map Based Vehicle Localization Using Stereo Camera", 2017 IEEE Intelligent Vehicles Symposium (IV), 6 pages.
(Continued)

*Primary Examiner* — Santiago Garcia
(74) *Attorney, Agent, or Firm* — Foley & Lardner LLP

(57) ABSTRACT

Provided is a position estimation device capable of highly accurate position estimation. A position estimation device 1 of the present invention is the position estimation device 1 which estimates a current position of a moving object 100 equipped with an imaging device 12, estimates the current position of the moving object 100, create a plurality of virtual positions based on the current position, creates virtual images at the plurality of virtual positions, respectively, compares the plurality of virtual images with an actual image to calculate a comparison error, calculates a weight based on at least one of information acquired by the imaging device 12 and information of a current position error of the moving object, performs weighting on the comparison error using the weight, and corrects the current position based on the comparison error to be weighted.

3 Claims, 13 Drawing Sheets

(56) References Cited

U.S. PATENT DOCUMENTS

| | | | |
|---|---|---|---|
| 2010/0106356 A1* | 4/2010 | Trepagnier | G05D 1/024 |
| | | | 701/25 |
| 2015/0015702 A1* | 1/2015 | Yamaguchi | G01S 3/7864 |
| | | | 348/142 |
| 2015/0235447 A1* | 8/2015 | Abovitz | G01B 11/303 |
| | | | 345/633 |
| 2017/0124713 A1* | 5/2017 | Jurgenson | G06T 7/246 |
| 2018/0129854 A1* | 5/2018 | Jeon | G06V 20/58 |
| 2018/0357836 A1* | 12/2018 | Ishiguro | G06V 20/20 |
| 2019/0108969 A1* | 4/2019 | Ogata | H01J 37/04 |
| 2019/0180717 A1* | 6/2019 | Haar | G06V 10/751 |
| 2019/0251747 A1* | 8/2019 | Yin | G06V 20/20 |
| 2020/0271450 A1* | 8/2020 | Gorursheshagiri | G06F 1/163 |
| 2020/0406753 A1* | 12/2020 | Hayashi | G08G 1/166 |

FOREIGN PATENT DOCUMENTS

| | | |
|---|---|---|
| JP | 2007-255979 A | 10/2007 |
| JP | 2008-175717 A | 7/2008 |
| JP | 2010-286298 A | 12/2010 |
| JP | 2016-188806 A | 11/2016 |
| WO | WO-2013/133129 A1 | 9/2013 |

OTHER PUBLICATIONS

International Search Report with English translation and Written Opinion issued in corresponding application No. PCT/JP2019/013964 dated Aug. 6, 2019.

\* cited by examiner

POSITION ESTIMATING DEVICE

TECHNICAL FIELD

The present invention relates to a technique for estimating a position of a moving object such as a robot and a car.

BACKGROUND ART

An autonomous traveling technology and a driving assistance technology in which a moving object, such as a robot and a car, collects information around the moving object, estimates a current position and a traveling state of the moving object, and controls traveling of the moving object have been developed. Various sensors are used to detect the information around the moving object. In general, sensors for measuring surrounding information include imaging devices such as a camera, laser sensors, and millimeter wave radars. A global positioning system (GPS) or an inertial measurement unit (IMU) is used as a sensor for measuring a position of a moving object.

In autonomous traveling control, a control device mounted on a moving object estimates a position of the moving object itself (self-position) by integrating the speed or angular velocity of the moving object calculated by the IMU or using GPS positioning. In addition, when there are neither map information nor any landmark and even GPS is not available, a simultaneous localization and mapping (SLAM) method is used to create a map of a traveling environment while estimating a relative position of an object existing around the moving object. Since an error of the relative position estimated by SLAM is accumulated, position correction is essential. For the position correction, for example, a control device collects surrounding information with a laser sensor, a camera, or the like, and detects a position or a shape of a three-dimensional object that serves as a reference for position estimation. Then, a current position of the moving object is corrected by comparing the detected position of the three-dimensional object with map information (map matching). Therefore, if an error of the detected position of the three-dimensional object is large, it is difficult to correct the position of the moving object. In addition, when a position error is already large before the correction, it is difficult to correct the current position even if the map matching is performed.

Here, for example, in NPL 1, a plurality of virtual current positions are created and virtual intensity image and parallax image are created using each of the virtual positions, map information, internal and external parameters of a sensor in order to estimate an accurate current position. The created virtual intensity image and parallax image are matched with actually acquired intensity image and parallax image, and a matching error is calculated by assigning a fixed weight to a matching result for each of the intensity image and parallax image. A virtual position with the smallest matching error is set as the current position.

CITATION LIST

Patent Literature

NPL 1: Yuquan Xu, et al. 3D point group Map Based Vehicle Localization Using Stereo Camera. 2017 IEEE Intelligent Vehicles Symposium. USA.

SUMMARY OF INVENTION

Technical Problem

However, the fixed weight is assigned to the matching result of the intensity image and the matching result of the parallax image at the time of calculating the matching error from each virtual position as in NPL 1, and thus, the reliability of information acquired by an imaging device is lowered due to the brightness of a traveling environment or a calibration error of the imaging device so that the current position accuracy estimated by the matching becomes low.

The present invention has been made in view of the above points, and an object thereof is to provide a position estimation device that can perform highly accurate position estimation.

Solution to Problem

In order to solve the above problem, a position estimation device of the present invention is a position estimation device that estimates a current position of a moving object equipped with an imaging device, the imaging device mounted on the moving object, the position estimation device including:

a current position estimation means for estimating the current position of the moving object;

a virtual position creation means for creating a plurality of virtual positions based on the current position estimated by the current position estimation means;

a virtual image creation means for creating each of a plurality of virtual images in a case of assuming that imaging is performed at the plurality of virtual positions by the imaging device;

an image matching means for comparing the plurality of virtual images with an image captured at the current position by the imaging device to calculate each of comparison errors;

a weighting means for calculating a weight based on at least one of information acquired by the imaging device and information on a current position error of the moving object obtained by the current position estimation means and weighting each of the comparison errors using the weight; and a position correction means for correcting the current position estimated by the current position estimation means based on each of the comparison errors to be weighted.

Advantageous Effects of Invention

According to the present invention, highly accurate matching is possible according to a traveling situation even in a situation where matching by images is difficult, such as a case where rain or sunlight is strong (backlight, shining, reflection) and a case where a calibration error of an imaging device is large.

Another characteristic relating to the present invention will become apparent from the description of the present specification and the accompanying drawings. In addition, other objects, configurations, and effects will be apparent from the following description of embodiments.

DESCRIPTION OF EMBODIMENTS

Hereinafter, a position estimation device of a moving object according to an embodiment of the present invention will be described with reference to the drawings.

Figure 1:
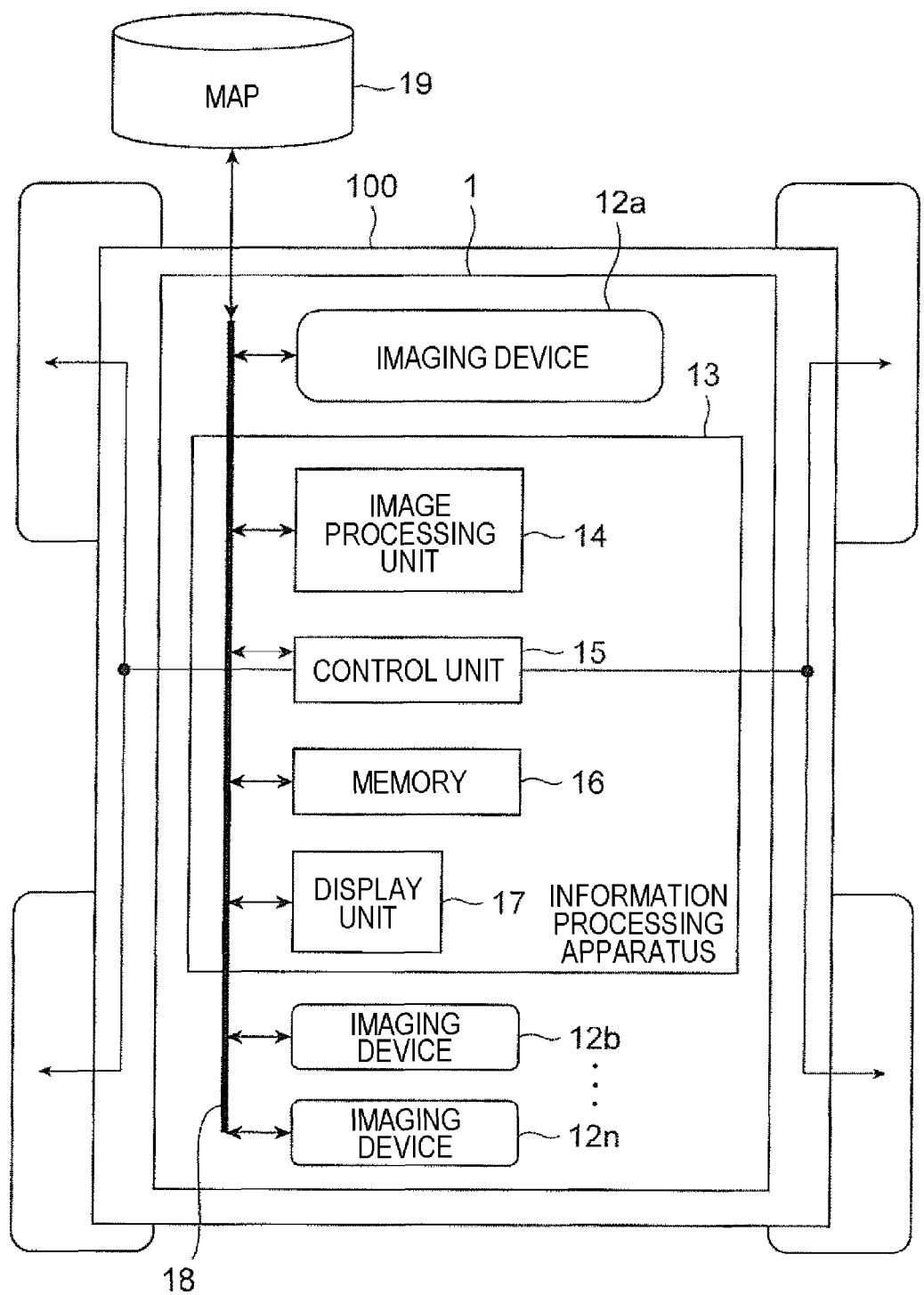
FIG. 1 is a configuration diagram of a position estimation device of a moving object according to an embodiment of the present invention.

FIG. 1 is a configuration diagram of a position estimation device 1 according to an embodiment of the present invention.

The position estimation device 1 estimates a current position of a moving object equipped with an imaging device, and is mounted on a moving object 100 such as a car and a robot. The position estimation device 1 includes one or more imaging devices 12 (12a, 12b, . . . , and 12n) and an information processing apparatus 13. The imaging device 12 is, for example, a still camera or a video camera. In addition, the imaging device 12 may be a monocular camera or a compound eye camera.

The information processing apparatus 13 processes an image captured by the imaging device 12 to calculate a position or a movement amount of the moving object 100. The information processing apparatus 13 may perform display according to the calculated position or the movement amount, or may output a signal related to control of the moving object 100.

The information processing apparatus 13 is, for example, a general computer, and includes: an image processing unit 14 that processes an image captured by the imaging device 12; a control unit (CPU) 15 that performs processing based on an image processing result; a memory 16; a display unit 17 such as a display; and a bus 18 that connects these components to each other. The information processing apparatus 13 performs the following processing as the image processing unit 14 and the control unit 15 execute a predetermined computer program.

The imaging device 12a is installed in front of the moving object 100, for example. A lens of the imaging device 12a faces the front side of the moving object 100. The imaging device 12a images, for example, a distant view in front of the moving object 100. The other Imaging device 12b, . . . , and imaging device 12n are installed at positions different from the imaging device 12a and image imaging directions or areas different from that of the imaging device 12a. The imaging device 12b may be installed, for example, at the rear of the moving object 100 to face the lower side. The imaging device 12b may capture a close view at the rear of the moving object 100.

If the imaging device 12 is a monocular camera and a road surface is flat, a distance from the imaging device 12 to a feature point can be calculated geometrically since the pixel position on the image and an actual ground positional relationship (x, y) are constant. When the imaging device 12 is a stereo camera, a distance to a feature point on an image can be measured more accurately. Although an example in which a camera having a monocular standard lens is adopted will be described in the following description, a camera other than this (a camera having a wide-angle lens or a stereo camera) may be adopted.

In addition, objects to be imaged by the imaging device 12a, the imaging device 12b, . . . , and the imaging device 12n at a certain time may be different from each other. For example, the imaging device 12a may image a distant view in front of the moving object 100. In this case, a feature point, such as a three-dimensional object and a landmark, for position estimation may be extracted from the image of the distant view. The imaging device 12b may image a close view such as a road surface around the moving object 100. In this case, a white line around the moving object 100, road surface paint, and the like may be detected from the image of the close view.

In addition, the imaging device 12a, the imaging device 12b, . . . , and the imaging device 12n may be installed at the moving object 100 under a condition that these imaging devices are not affected by environmental disturbance such as rain and sunlight at the same time. For example, the imaging device 12a may be installed to face the front side in front of the moving object 100, and the imaging device 12b may be installed to face the rear side or the lower side at the rear of the moving object 100. As a result, for example, even if raindrops adhere to the lens of the imaging device 12a during rainfall, it is difficult for raindrops to adhere to a lens of the imaging device 12b facing the opposite direction in the advancing direction or the lower side. Therefore, even if an image captured by the imaging device 12a is unclear due to the influence of raindrops, an image captured by the imaging device 12b is less likely to be affected by raindrops. Alternatively, even if an image of the imaging device 12a is unclear due to the influence of sunlight, an image captured by the imaging device 12b is likely to be clear.

In addition, the imaging device 12a, the imaging device 12b, . . . , and the imaging device 12n may capture an image under mutually different imaging conditions (an aperture value, white balance, and the like). For example, imaging may be possible regardless of whether an environment is bright or dark by mounting an imaging device with parameters adjusted for a bright place and an imaging device with parameters adjusted for a dark place.

The imaging device 12a, the imaging device 12b, . . . , and the imaging device 12n capture an image when receiving a command to start capturing from the control unit 15 or at regular time intervals. Data and capturing time of the captured image are stored in the memory 16. The memory 16 includes a main storage device (main memory) of the information processing apparatus 13 and an auxiliary storage device such as a storage.

The image processing unit 14 performs various types of image processing based on the image data and capturing time stored in the memory 16. In this image processing, for example, an intermediate image is created and stored in the memory 16. The intermediate image may be used not only for the processing by the image processing unit 14 but also for determination and processing by the control unit 15 and the like.

The bus 18 can be configured using an inter equipment bus (IEBUS), local interconnect network (LIN), a controller area network (CAN), or the like.

The map 19 has information on an environment in which the moving object 100 travels (an environment information storage means). The map 19 stores, for example, information on shapes and positions of stationary objects (trees, buildings, roads, lanes, signals, signs, road surface paints, road edges, and the like) existing in a traveling environment. Each piece of the information on the map 19 may be represented by a mathematical expression. For example, line information may include only a slope and an intercept of a line without being formed of a plurality of points. In addition, the information on the map 19 may be represented by a point group without distinction. The point group may be represented by 3D(x, y, z) and 4D(x, y, z, color) or the like. Finally, if the traveling environment is detected from the current position of the moving object 100 and the map matching is possible, the information of the map 19 may be provided in any form.

The image processing unit 14 projects the map information on an image captured by the imaging device 12 based on the current position of the moving object 100 and internal parameters of the imaging device 12 stored in the map 19 and the memory 16. The image processing unit 14 identifies a plurality of position candidates of the moving object 100 based on the image captured by the imaging device 12, and estimates a position of the moving object 100 based on the plurality of position candidates and the moving speed of the moving object 100.

The image processing unit 14 processes the image captured by the imaging device 12, for example, during traveling of the moving object 100 to estimate the position of the moving object 100. For example, the image processing unit 14 calculates a movement amount of the moving object 100 using a video image captured by the imaging device 12, and adds the movement amount to a past position to estimate a current position. The image processing unit 14 may extract a feature point from each frame image of the video image. The image processing unit further extracts the same feature point in the subsequent frame images. Then, the image processing unit 14 calculates the movement amount of the moving object 100 by tracking the feature points.

The control unit 15 may output a command regarding the moving speed to the moving object 100 based on a result of the image processing of the image processing unit 14. For example, the control unit 15 may output a command to increase, a command to decrease, or a command to maintain the moving speed of the moving object 100 depending on the number of pixels of a three-dimensional object in the image, the number of outlier values among the feature points in the image, a type of image processing, or the like.

Figure 2:
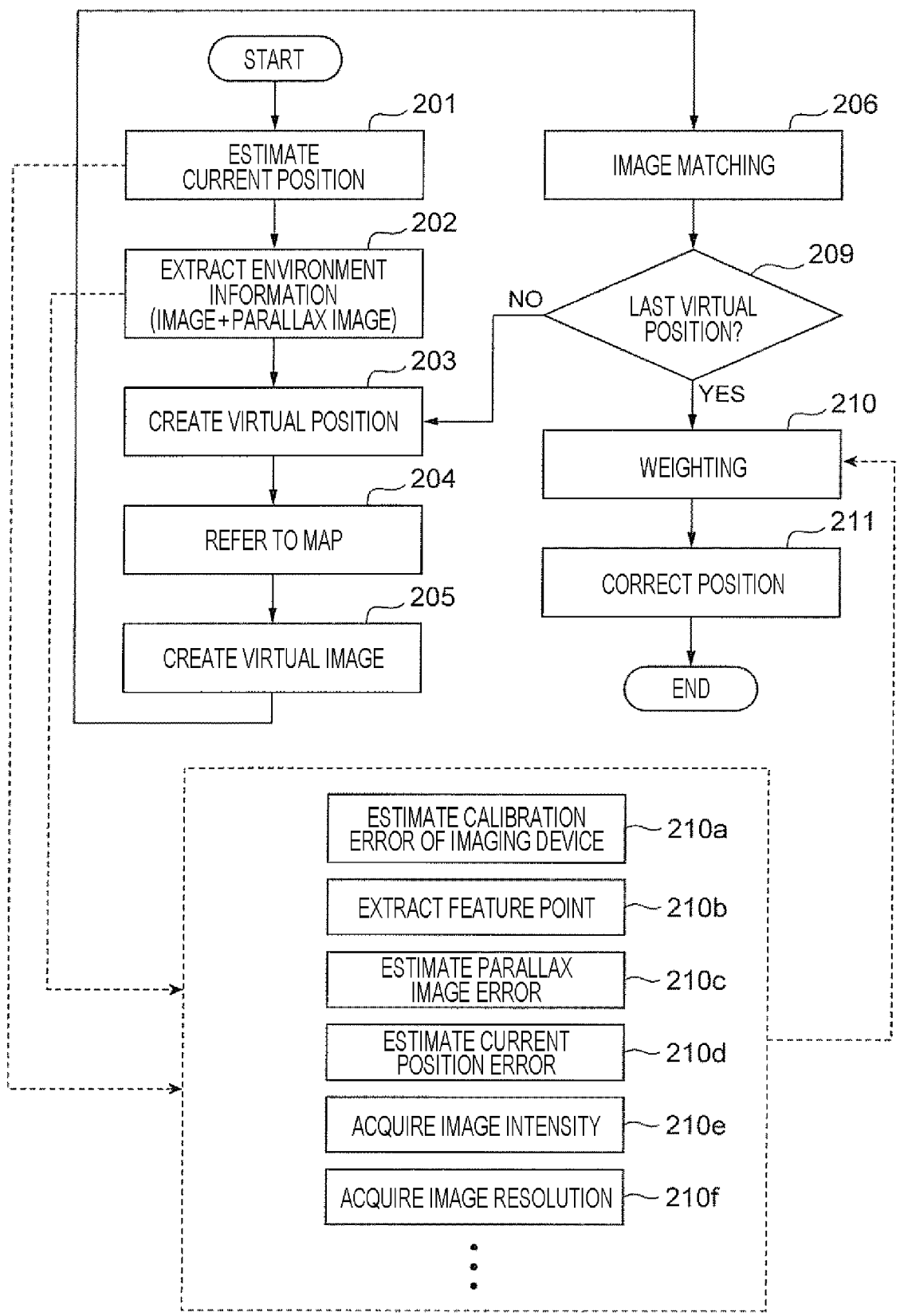
FIG. 2 is a flowchart illustrating an image processing procedure performed by an image processing unit.

FIG. 2 is a flowchart illustrating an image processing procedure performed by the image processing unit 14.

A current position estimation means 201 is a means for estimating a current position of the moving object 100. The current position estimation means 201 is configured using, for example, a GPS that estimates an absolute position. In addition, the current position estimation means 201 may be configured by odometry that estimates a relative position from a certain reference point. Although a position error occurs in the above-described position estimation method based on the GPS or odometry, the position error is corrected by a position correction means 211 which will be described later.

An environment information extraction means 202 is a means for extracting environment information on the periphery of the moving object 100 acquired by the imaging device 12a, the imaging device 12b, . . . , and the imaging device 12n mounted on the moving object 100. The environment information extraction means 202 acquires a grayscale image or a color image of the periphery of the moving object 100 imaged by the imaging device 12a, the imaging device 12b, . . . , and the imaging device 12n. In addition, a parallax image created from the image captured by the imaging device 12a, the imaging device 12b, . . . , and the imaging device 12n may be acquired. Then, information of the feature points on the image captured by the imaging device 12a, the imaging device 12b, . . . , and the imaging device 12n may be acquired.

In addition, line information on the image captured by the imaging device 12a, the imaging device 12b, . . . , and the imaging device 12n may be acquired.

A virtual position creation means 203 is a means for creating a virtual position based on the current position estimated by the current position estimation means 201. The number of virtual positions created by the virtual position creation means 203 is one or more, and the number is not a fixed value and is changed in response to the traveling environment. Details of the virtual position creation means 203 will be described later.

A map reference means 204 is a means for acquiring information from the map 19. The information is acquired from the map 19 based on a command from the control unit 15. The entire information on the map 19 may be acquired by the command from the control unit 15. In addition, only the information on the periphery of the moving object 100 may be acquired.

A virtual image creation means 205 creates each virtual image using map information acquired by the map reference means 204 and each of the virtual positions created by the virtual position creation means 203. The virtual image is an image in the case of assuming that the virtual image is captured by the imaging device from the virtual position. For example, when the map 19 is constituted by point groups of 3D (x, y, z), each point is converted into a pixel (u, v). In addition, the virtual image creation means 205 creates an image in accordance with the information of the map 19. For example, when the map 19 is constituted by point groups of 3D (x, y, z), each point is converted into a pixel (u, v), and distance information is added to the pixel (u, v). Therefore, a virtual image is constituted by (u, v, distance).

When the map 19 is constituted by point groups of 4D (x, y, z, color), a virtual image may be constituted by (u, v, color) by adding color information to pixel (u, v) of each point. In addition, when the map 19 is constituted by point groups of 3D (x, y, z), a virtual parallax image may be constituted by (u, v, depth) by adding depth information to pixel (u, v) of each point. The color information is the intensity of a pixel. An image is displayed in color or grayscale, and the intensity of each pixel in the image ranges from 0 to 255 (black to white) in the case of grayscale, and there are three channels of R (0 to 255)+G (0 to 255)+B (0 to 255) in the case of color. Further, the depth information is a length in the Z-axis direction which is a detection direction of a sensor such as the imaging device.

An image matching means 206 is a means for matching (comparing) an image actually captured by the imaging device 12a, the imaging device 12b, . . . , and the imaging device 12n in the environment information extraction means 202 with the virtual image created by the virtual image creation means 205. The image matching means 206 will be described later.

A conditional branch 209 checks whether the virtual position creation means 203 has created the last virtual position. The process proceeds to virtual position creation means 203 if the last virtual position has not been created, or proceeds to a weighting means 210 if the last virtual position has been created.

The weighting means 210 is a means for assigning a weight to each matching result (comparison error) obtained by the image matching means 206. The weighting means 210 calculates a weight in response to the traveling environment and a state of the sensor. The weighting means 210 calculates a weight based on at least one of information acquired by the imaging device and information on a current position error of the moving object 100 obtained by the current position estimation means. The information acquired by the imaging device includes at least one of information on the calibration error of the imaging device, information on the feature point on the image extracted from the image captured by the imaging device, information on a parallax image error acquired from the image captured by the imaging device, information on image intensity acquired from the image captured by the imaging device, and information on an image resolution acquired from the image captured by the imaging device. The weighting means 210 is constituted by an imaging device calibration error estimation means 210a, a feature point extraction means 210b, a parallax image error estimation means 210c, a current position error estimation means 210d, an image intensity acquisition means 210e, an image resolution acquisition means 210f, and the like.

The imaging device calibration error estimation means 210a of the weighting means 210 estimates each calibration error of the imaging device 12a, the imaging device 12b, . . . , and the imaging device 12n. The above-described calibration is a step configured to correct each distortion of the imaging device 12a, the imaging device 12b, . . . , and the imaging device 12n, and imaging is performed by the imaging device 12a, the imaging device 12b, . . . , and the imaging device 12n using a known pattern. Meanwhile, an error occurs because calibration results differ depending on the number of images captured by the imaging device 12a, the imaging device 12b, . . . , and the imaging device 12n or distances, positions, angles, and the like when imaging is performed by the imaging device 12a, the imaging device 12b, . . . , and the imaging device 12n. The imaging device calibration error estimation means 210a obtains the above-described error and outputs the result to the weighting means 210.

The feature point extraction means 210b of the weighting means 210 extracts feature points on an image captured by the imaging device 12a, the imaging device 12b, . . . , and the imaging device 12n.

The above-described feature points are a corner, an edge, a maximum value, a minimum value, and the like on the image captured by the imaging device 12a, the imaging device 12b, . . . , and the imaging device 12n. The feature points extracted by the feature point extraction means 210b are output to the weighting means 210.

The parallax image error estimation means 210c of the weighting means 210 estimates an error at the time of creating a parallax image using the image captured by the imaging device 12a, the imaging device 12b, . . . , and the imaging device 12n. The above-described parallax image error described above is, for example, an error caused by calibration for creation of a parallax image. When creating a parallax image, it is necessary to accurately estimate relative positions of the imaging device 12a, the imaging device 12b, . . . , and the imaging device 12n, and an error of the output parallax image becomes large if an error occurs in the estimated relative positions. In addition, when creating a parallax image, it is necessary to search for and retrieve information reflecting on the imaging device 12a, the imaging device 12b, . . . , and the imaging device 12n with the respective images of the imaging devices, and thus, the error of the output parallax image becomes large if a search error occurs.

The current position error estimation means 210d of the weighting means 210 estimates an error in the position estimated by the current position estimation means 201. For example, when the current position estimation means 201 estimates the current position of the moving object 100 by the GPS, an error output by the GPS is used as the current position error. In addition, when the current position of the moving object 100 is estimated by the current position estimation means 201 using a method of estimating a relative position from a certain reference, an error proportional to a traveling distance may be used as the current position error.

The image intensity acquisition means 210e of the weighting means 210 is a means for acquiring the pixel intensity (image intensity) of each of images acquired by the imaging device 12a, the imaging device 12b, . . . , and the imaging device 12n After acquiring the pixel intensity of each of the images captured by the imaging device 12a, the imaging device 12b, . . . , and the imaging device 12n, the image intensity acquisition means 210e searches for a pixel that is too dark below a lower limit and a pixel that is too bright above an upper limit.

The image resolution acquisition means 210f of the weighting means 210 is a means for acquiring a resolution of each of the images acquired by the imaging device 12a, the imaging device 12b, . . . , and the imaging device 12n. Details of the weighting means 210 will be described later.

The position correction means 211 is a means for correcting the current position estimated by the current position estimation means 201 using the weighting means 210. The minimum error is searched for in a matching error (comparison error) of each virtual image weighted by the weighting means 210. Then, a virtual position having the minimum error is set as the current position.

Figure 3:
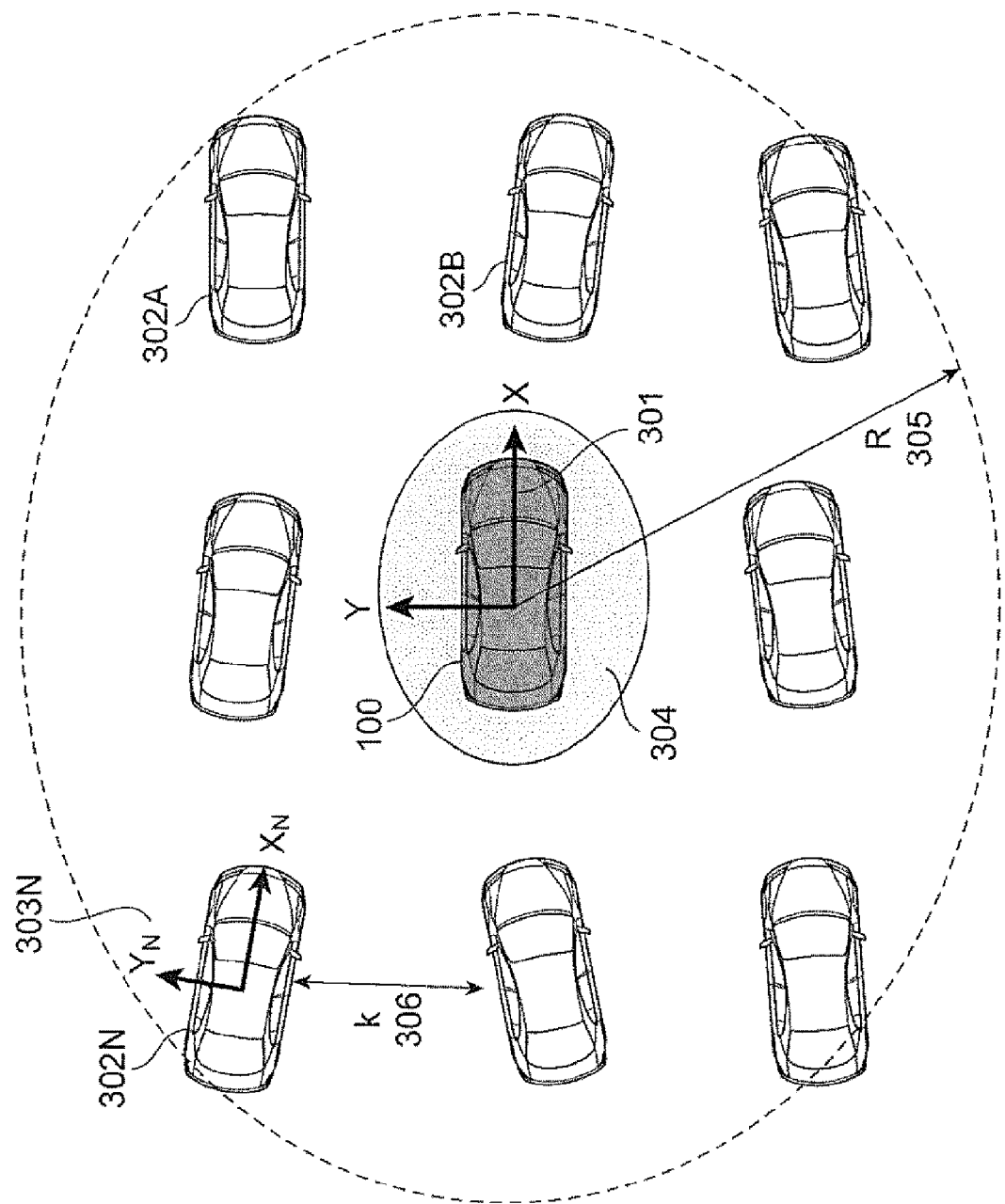
FIG. 3 is a view illustrating an example of a virtual position creation method.

FIG. 3 is a view illustrating an example of a virtual position creation method. Details of the virtual position creation means 203 will be described with reference to FIG. 3. A coordinate system 301 uses a current position estimated by the current position estimation means 201 of the moving object 100 as the origin. Virtual positions (302A, 302B, . . . , and 302N) are positions on the coordinate system 301, and coordinates of the respective virtual positions are 303A, 303B, . . . , and 303N.

An estimated position error 304 is a position error of the moving object 100 estimated by the current position error estimation means 210d. A range of the position error 304 is a range centered on the current position of the moving object 100 estimated by the current position estimation means 201, and a size thereof changes depending on the position error estimated by the current position error estimation means 210d.

A range R305 is a range in which a virtual position is created. The virtual position creation means 203 creates a plurality of virtual positions based on the current position of the moving object 100 estimated by the current position estimation means 201. Since the number N of virtual positions created by the virtual position creation means 203 depends on the traveling environment and situation of the moving object 100, the range R305 is set based on the position error 304 estimated by the current position error estimation means 210d. A virtual position is a position and an orientation set within a predetermined range centered on the estimated current position of the moving object.

An interval k 306 between virtual positions is an interval obtained by dividing a distance from a current position 301 estimated by the current position estimation means 201 of the moving object 100 to the virtual position range R305 by a predetermined number. The interval k 306 is adjusted based on the obtained position accuracy and the accuracy of the imaging device 12a, the imaging device 12b, . . . , and the imaging device 12n. When the position accuracy estimated by the position estimation means 211 is R, a virtual position is created using the preset interval k, but k may be adjusted based on the position estimation accuracy required for the traveling environment. For example, when the position accuracy designated by the position estimation means 211 is R, the position accuracy corrected by the position correction means 211 using the interval k is k. On the other hand, when the accuracy required for the traveling environment is 0.5R, a position is corrected by changing the interval k to the interval 0.5R. FIG. 3 is illustrated in X-Y coordinates for simplicity, but virtual positions may be created by Z, roll, pitch, and yaw (6DOF).

Meanwhile, when there are many dimensions, a processing time increases, and thus, a virtual position is created according to an error in each dimension. For example, when there is a one-lane road on which the moving object 100 travels and the moving object 100 is equipped with a white line detection function, an error of the moving object 100 in the Y direction becomes low, and thus, the virtual position creation means 203 does not necessarily create a virtual position in the Y direction. In addition, different intervals k 306 in the X and Y directions may be set to adjust the number of virtual positions in each direction. In addition, when there are few irregularities in the environment in which the moving object 100 travels, virtual positions are not created for the Z direction, pitch, and roll, but estimated accurately only for X, Y, and yaw within a short processing time. Note that an orientation of a vehicle at a virtual position may be set using a certain range a and an interval K obtained by dividing the certain range a. For the interval K, the same k (k=K) as the case of creating the virtual position is set, but K may be adjusted (K>k or K<k) based on the current position error estimated by the current position error estimation means 210d.

Figure 4:
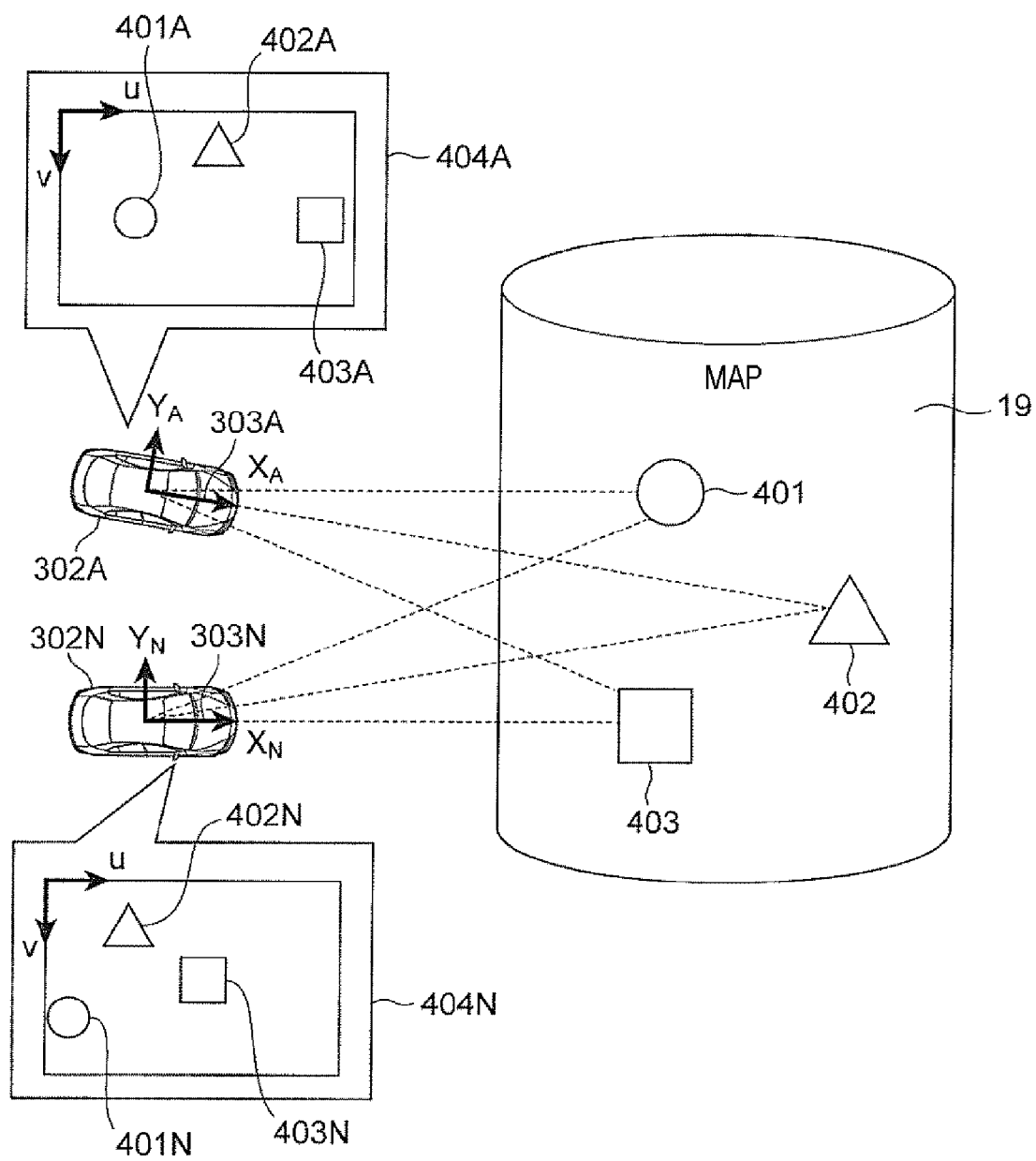
FIG. 4 is a view illustrating an example of a virtual image creation method.

FIG. 4 is a view illustrating an example of a virtual image creation method. The virtual image creation means 205 will be described with reference to FIG. 4.

Each piece of map information 401, 402, and 403 is information described on the map 19. A virtual image 404A is an image in the case of assuming that imaging is performed at the virtual position 302A by the imaging device 12a, the imaging device 12b, . . . , and the imaging device 12n, and a virtual image 404N is an image in the case of assuming that imaging is performed at the virtual position 302N by the imaging device 12a, the imaging device 12b, . . . , and the imaging device 12n. At this time, positions of the coordinate 303A and the coordinate 303N with respect to the map 19 and the internal parameters of the imaging device 12a, the imaging device 12b, . . . , and the imaging device 12n are known, and thus, each piece of the map information 401, 402, and 403 is displayed as each piece of information 401A, 402A, and 403A on the virtual image 404A, and displayed as each piece of information 401N, 402N, and 403N on the virtual image 404N.

If only information on the position (x, y, z) of the traveling environment is described in the map information 19, the information on the map 19 is three-dimensional (x, y, z), the virtual image 404A and the virtual image 404N can be represented by (u, v, distance) or (u, v, depth). In addition, if the position (x, y, z) and color information of the traveling environment are described in the map information 19, the information of the map 19 is four-dimensional (x, y, z, color), the virtual image 404A and virtual image 404N can be represented by (u, v, color).

Since the map 19 includes near-field information and far-field information of a current position of the moving object 100, a processing time becomes long when a virtual image is created using the entire information.

Therefore, only information within a predetermined threshold (height, distance, or the like) from the current position of the moving object 100 may be converted into an image. In addition, each imaging range of the imaging device 12a, the imaging device 12b, . . . , and the imaging device 12n is determined, and thus, a virtual image may be created using information within the imaging range.

Details of the weighting means 210 will be described with reference to FIGS. 5A to 5E.

Figure 5A:
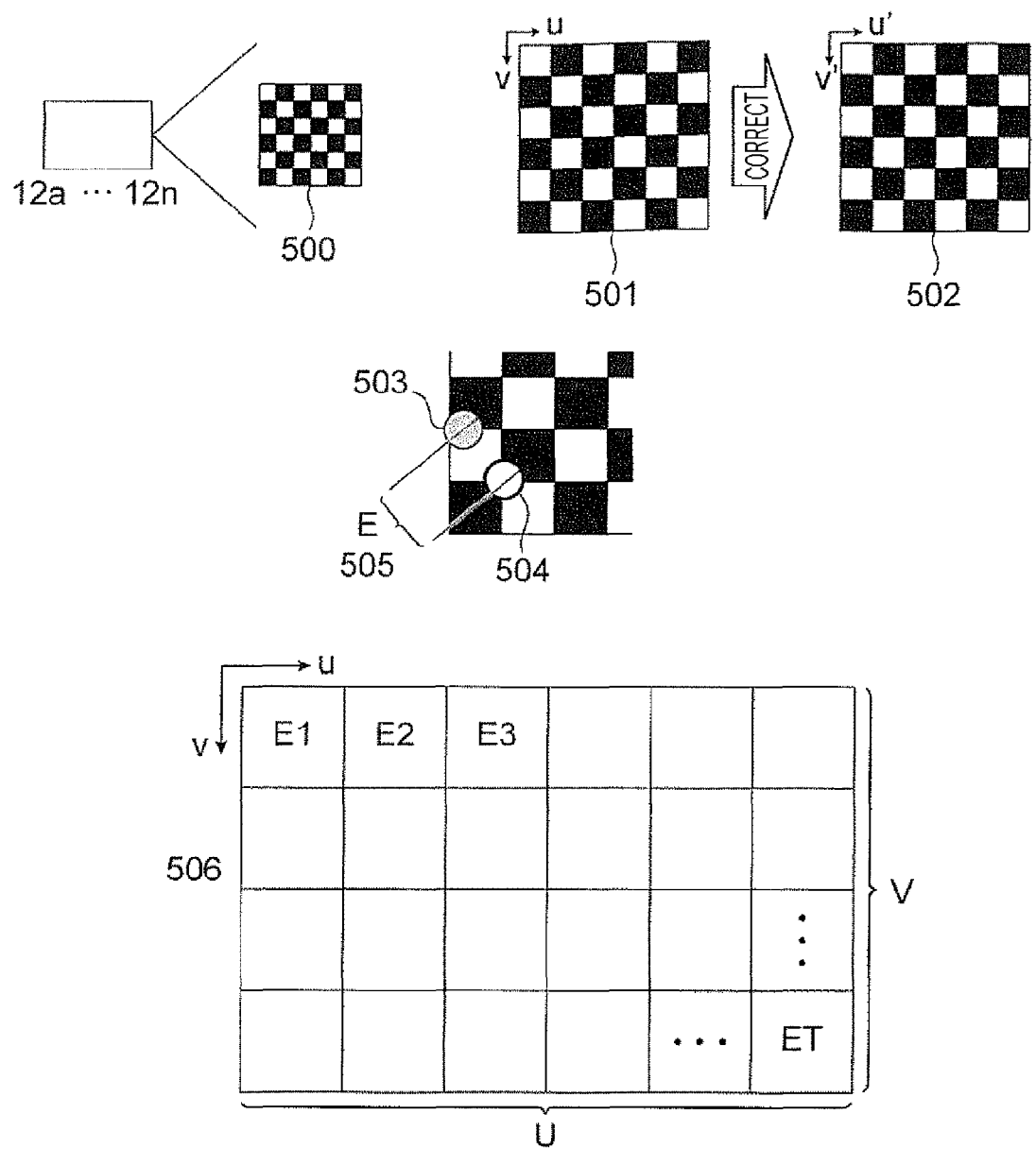
FIG. 5A is a view illustrating an example of a method of calculating a weight based on a calibration error.

FIG. 5A is a view illustrating an example of a method of calculating a weight based on a calibration error, and represents weighting using calibration parameters of the imaging device 12a, the imaging device 12b, . . . , and the imaging device 12n. The imaging device calibration error estimation means 210a estimates each calibration error of the imaging device 12a, the imaging device 12b, . . . , and the imaging device 12n.

A pattern 500 is a pattern imaged by the imaging device 12a, the imaging device 12b, . . . , and the imaging device 12n. An image 501 is an image acquired before calibration of the imaging device 12a, the imaging device 12b, . . . , and the imaging device 12n. Since the acquired image is distorted before the calibration, the pattern 500 is erroneously imaged when being imaged by the imaging device 12a, the imaging device 12b, . . . , and the imaging device 12n.

On the other hand, an image 502 represents an image corrected by a conventional calibration technique. In this case, distortion has been corrected, and thus, the image 502 captured by the imaging device 12a, the imaging device 12b, . . . , and the imaging device 12n becomes the same as the actual pattern 500.

There is a case where complete correction is not possible even if calibration is performed. Since corner positions of the pattern 500 are arranged at equal intervals when calibration is performed, it is possible to estimate a corner position after correction, and the estimated corner position is set as a pixel 503. On the other hand, when an actual position of a corner on the image 502 is a pixel 504, an error E505 from the estimated pixel 503 occurs. Therefore, an error map 506 (information on a calibration error) including errors E1, E2, . . . , and ET is obtained by calculating each error between a pixel position estimated for each pixel of the imaging device 12a, the imaging device 12b, . . . , and the imaging device 12n, and an actual position. When the number of pixels is U×V, the error map is obtained with T=U×V.

A weight $\lambda c$ is assigned based on Formula (1) and the above-described error map 506. When the calculated errors E1, E2, . . . , and ET of the error map 506 are lower than a certain threshold Ethreshold, a parameter I increases. A ratio of the parameter I to all the pixels (U×V) is set as the weight λc.

$$\text{if } E > \text{Ethreshold}, I++\lambda c = I/(U \times V) \quad (1)$$

The calibration may be performed periodically while the moving object 100 is traveling, for example, or the weight may be calculated each time the calibration is performed.

Figure 5B:
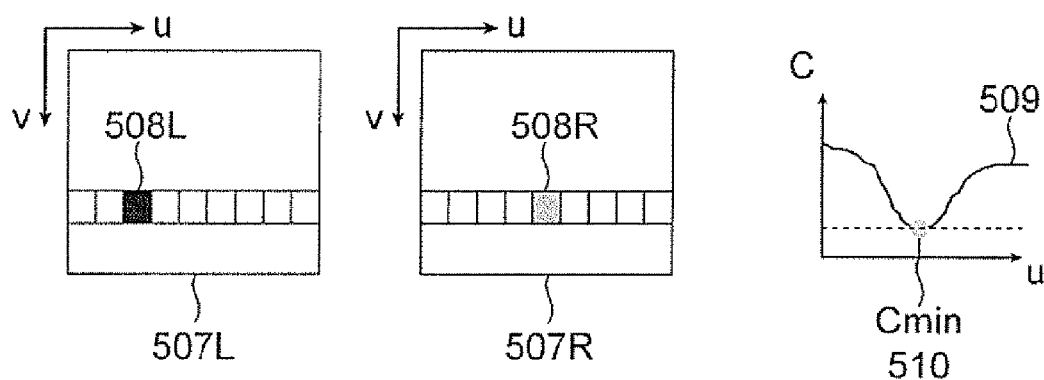
FIG. 5B is a view illustrating an example of a method of calculating a weight based on a parallax image error.

FIG. 5B is a view illustrating an example of a method of calculating a weight based on a parallax image error. A description will be given regarding weighting using parameters when a parallax image is created by the imaging device 12a, the imaging device 12b, . . . , and the imaging device 12n with reference to FIG. 5B. An image 507L is a left image for creating the parallax image, and an image 507R is a right image for creating the parallax image. When creating the parallax image, a pixel of the image 507R having the same information as each pixel information of the image 507L is searched. A conventional parallax image creation technique performs search with a pixel intensity, and matching is performed with a pixel having the closest intensity.

For example, when a pixel 508L is a pixel of the image 507L and pixel intensities of the image 507R are compared (searched), a graph 509 is obtained. A vertical axis C of the graph 509 is an error amount obtained by comparing pixels of the left and right images. A pixel with the smallest error (Cmin 510) is 508R. As in Formula (2), if the minimum error amount Cmin obtained at each pixel of the image 507L is smaller than a predetermined threshold Cthreshold, a parameter J increases. A ratio of the parameter J to all the pixels (U×V) is set as a weight λs. As the parallax image error decreases, the weight λs increases.

$$\text{if } C\text{min} < C\text{threshold}, J++\lambda s = J/(U \times V) \quad (2)$$

Figure 5C:
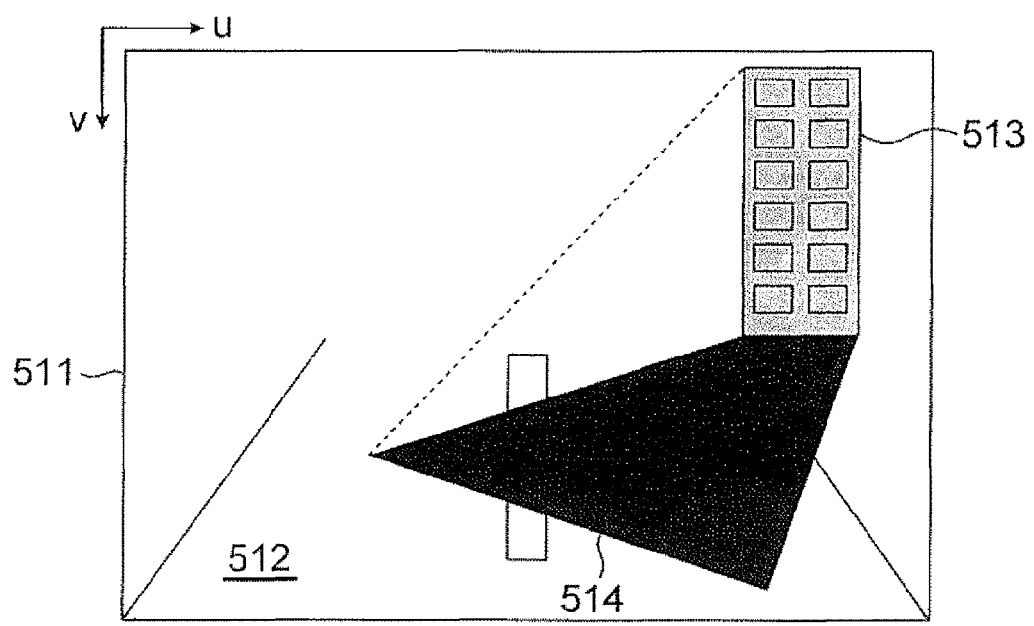
FIG. 5C is a view illustrating a method of calculating a weight based on an image intensity.

FIG. 5C is a view illustrating a method of calculating a weight based on an image intensity. Weighting based on the pixel intensity will be described with reference to FIG. 5C.

An image 511 is an image acquired by the imaging device 12a, the imaging device 12b, . . . , and the imaging device 12n from a current position.

A road surface 512 is a road surface of a road on which the moving object 100 is traveling.

At this time, a part of the image 511 became dark (the intensity became zero) due to a shadow 514 of a stationary object 513. Since the image 511 at this time has many dark pixels, an error increases when position estimation is performed using the image 511. Therefore, the number of bright pixels (intensity=100%) and dark pixels (intensity=0%) is represented by a parameter K. Since the reliability is lowered as the number of bright pixels (intensity=100%) or dark pixels (intensity=0%) increases, a weight λI based on the pixel intensity is calculated using Formula (3).

$$\text{if intensity=0\% OR intensity=100\%, } K++\lambda I=1-K/(U \times V) \quad (3)$$

Although the description has been given with dark pixels for simplicity, the reliability is lowered even if the pixel intensity is too high (too bright), and thus, the weight λI in Formula (3) decreases. According to the above Formula (3), the weight λI decreases in a case where the pixel intensity is too weak, such as the case of rain, and a case where the pixel intensity is too strong, such as the case of backlight.

Figure 5D:
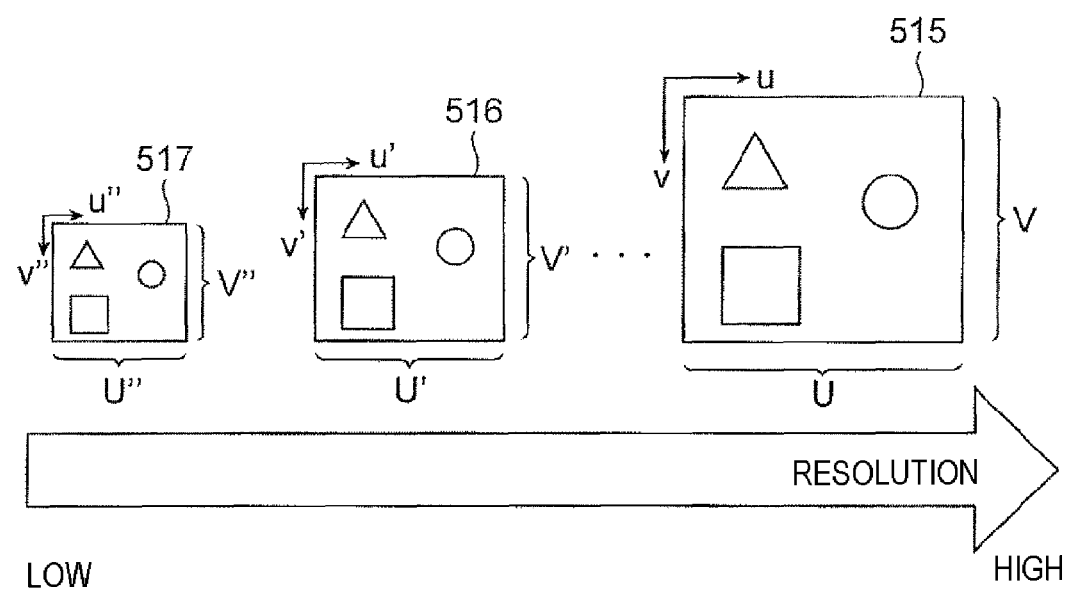
FIG. 5D is a view illustrating a method of calculating a weight based on an image resolution.

FIG. 5D is a view illustrating a method of calculating a weight based on an image resolution. A description will be given regarding weighting based on a resolution of an image captured by the imaging device 12a, the imaging device 12b, . . . , and the imaging device 12n with reference to FIG. 5d.

An image 515 has the maximum resolution that can be imaged by the imaging device 12a, the imaging device 12b, . . . , and the imaging device 12n, and is constituted by a total of U×V pixels. When position estimation is performed with the high-resolution image, the reliability is high. Meanwhile, an image 516 has a lower resolution than the image 515 (V'<V and U'<U). In addition, an image 517 has a lower resolution than the image 516 (V''<V' and U''<U'). Therefore, the position estimation with the image 516 has lower reliability than the position estimation with the image 515, and the reliability in the position estimation with the image 517 is still lower. Here, weighting is performed based on the image resolution of the image captured by the imaging device 12a, the imaging device 12b, . . . , and the imaging device 12n. A weight also increases as the image resolution increases.

$$\lambda r = (\text{Image Resolution})/(U \times V) \quad (4)$$

Figure 5E:
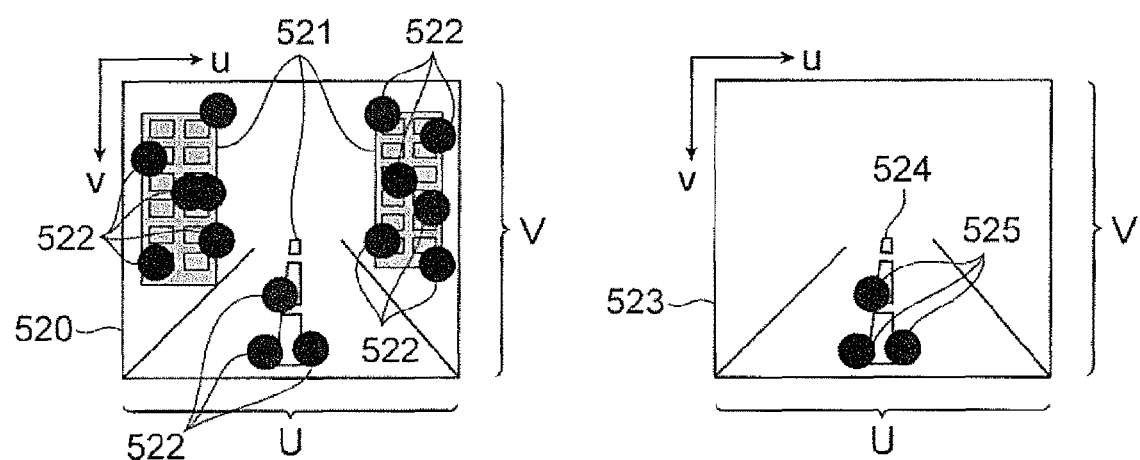
FIG. 5E is a view illustrating a method of calculating a weight based on a feature point.

FIG. 5E is a view illustrating a method of calculating a weight based on a feature point. A description will be given regarding weighting based on the number of feature points extracted by the imaging device 12a, the imaging device 12b, . . . , and the imaging device 12n with reference to FIG. 5E.

An image 520 is an image acquired by the imaging device 12a, the imaging device 12b, . . . , and the imaging device 12n. A stationary object 521 is a stationary object reflected on the image 520. Feature points 522 are feature points extracted from the stationary object 521 on the image 520. On the other hand, an image 523 is an image of an environment different from that in the case of acquiring the image 520 by the imaging device 12a, the imaging device 12b, . . . , and the imaging device 12n. A stationary object 524 is a stationary object reflected on the image 523. Feature points 525 are feature points extracted from the stationary object 524 on the image 523.

Since the number of feature points extracted from the stationary object 521 of the image 520 is larger than the number of feature points extracted from the stationary object 524 of the image 523, the reliability of a matching result of the image 520 is high. Therefore, a weight is calculated using the number of feature points as in Formula (5). The weight increases as the number of feature points increases.

$$\lambda T = (\text{Number of Feature Points})/(U \times V) \quad (5)$$

Figure 6:
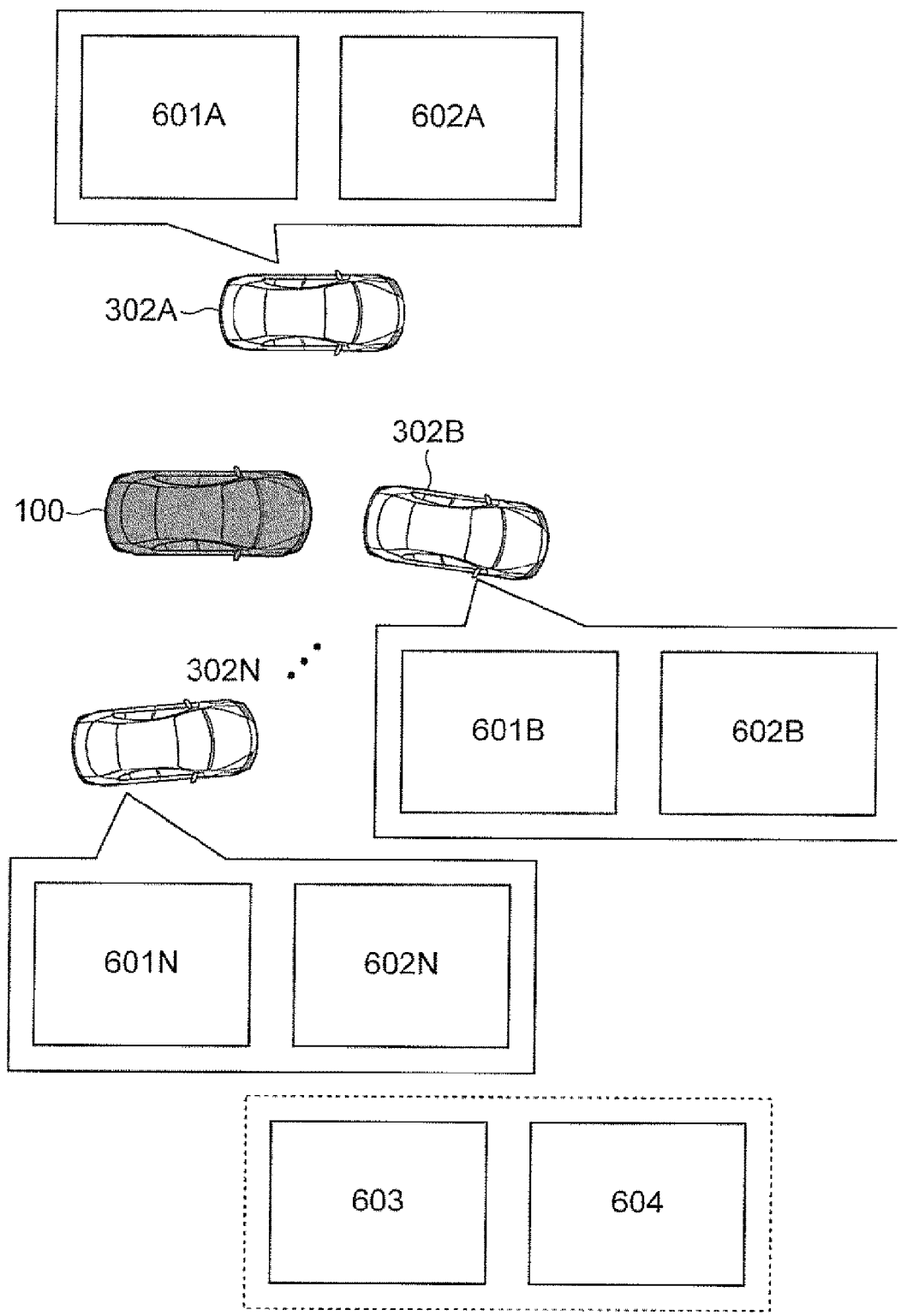
FIG. 6 is a view illustrating an example of an image matching method.

FIG. 6 is a view illustrating an example of an image matching method. The image matching means 206 will be described with reference to FIG. 6. In this example, matching between a virtual image and an actually captured image and matching between a virtual distance image and a distance image created from the actually captured image are performed to calculate a comparison error of the virtual image and a comparison error of the virtual distance image, and the comparison error of the virtual image and the comparison error of the virtual distance image are combined to calculate an averaged comparison error.

Virtual images 601A, 601B, . . . , and 601N are virtual images (u, v, color) created from the virtual positions 302A, 302B, . . . , and 302N. Virtual distance images 602A, 602B, . . . , and 602N are virtual distance images (u, v, distance) created from the virtual positions 302A, 302B, . . . , and 302N. An image 603 is an image (u, v, color) actually captured by the imaging device 12a, the imaging device 12b, ..., and the imaging device 12n from a current position of the moving object 100. An image 604 is a distance image (u, v, distance) actually captured by the imaging device 12a, the imaging device 12b, ..., and the imaging device 12n from the current position of the moving object 100.

The virtual images 601A, 601B, ..., and 601N created from the respective virtual positions 302A, 302B, ..., and 302N are compared with the actually captured image 603, and the respective comparison errors are set as EiA, EiB, ..., and EiN. Colors of the pixels (u, v) of the virtual images 601A, 601B, ..., and 601N created from the respective virtual positions 302A, 302B, ..., and 302N are set as color A, color B, ..., and color N, and a color of the pixel (u, v) of the actually captured image 603 is set as color r. Therefore, the above-described comparison is a difference for each pixel (u, v) as in Formula (6), for example. An average of EiA, EiB, ..., and EiN obtained at each pixel is defined as EiA', EiB', ..., and EiN' as in Formula (6').

$$EiA(u, v) = |Color\ r - Color\ A| \quad (6)$$
$$EiB(u, v) = |Color\ r - Color\ B|$$
$$...$$
$$EiN(u, v) = |Color\ r - Color\ N|$$

$$EiA' = [EiA(1, 0) + ... + EiA(U, V)]/(U \times V) \quad (6')$$
$$EiB' = [EiB(1, 0) + ... + EiB(U, V)]/U \times V$$
$$...$$
$$EiN' = [EiN(1, 0) + ... + EiN(U, V)]/U \times V$$

The virtual distance images 602A, 602B, ..., and 602N created from the respective virtual positions 302A, 302B, ..., and 302N are compared with the distance image 604 created from the image actually captured by the imaging device, and the respective comparison errors are set as EsA, EsB, ..., and EsN. Distances of the pixels (u, v) of the virtual images 601A, 601B, ..., and 601N created from the respective virtual positions 302A, 302B, ..., and 302N are set as distance A, distance B, ..., and distance N, and a distance of the pixel (u, v) of the actually captured distance image 604 is set as distance r. Therefore, the above-described comparison is a difference for each pixel (u, v) as in Formula (7), for example. An average of EsA, EsB, ..., and EsN obtained at each pixel is defined as EsA', EsB', ..., and EsN' as in Formula (7').

$$EsA(u, v) = |Distance\ r - Distance\ A| \quad (7)$$
$$EsB(u, v) = |Distance\ r - Distance\ B|$$
$$...$$
$$EsN(u, v) = |Distance\ r - Distance\ N|$$

$$EsA' = [EsA(1, 0) + ... + EsA(U, V)]/(U \times V) \quad (7')$$
$$EsB' = [EsB(1, 0) + ... + EsB(U, V)]/U \times V$$
$$...$$
$$EsN' = [EsN(1, 0) + ... + EsN(U, V)]/U \times V$$

At this time, a weight Wi of the image 603 actually captured from the current position of the moving object 100 is calculated as in Formula (8) using the weight described in FIG. 5.

$$Wi = \lambda c \cdot \lambda I \cdot \lambda r \cdot \lambda T \quad (8)$$

In addition, a weight Ws of the distance image 604 actually captured from the current position of the moving object 100 is calculated as in Formula (9) using the weight described in FIG. 5.

$$Ws = \lambda c \cdot \lambda s \cdot \lambda r \cdot \lambda T \quad (9)$$

Therefore, combinations of the average errors EiA', EiB', ..., and EiN' obtained between the virtual images 601A, 601B, ..., and 601N created from the respective virtual positions 302A, 302B, ..., and 302N and the virtual distance images 602A, 602B, ..., and 602N, and EsA', EsB', ..., and EsN' are set as comparison errors EfA, EfB, ..., and EfN. Formula (10) represents details of the comparison errors EfA, EfB, ..., and EfN.

$$EfA = (Wi \cdot EiA' + Ws \cdot EsA')/(Wi + Ws) \quad (10)$$
$$EfB = (Wi \cdot EiB' + Ws \cdot EsB')/(Wi + Ws)$$
$$...$$
$$EfN = (Wi \cdot EiN' + Ws \cdot EsN')/(Wi + Ws)$$

The position correction means 211 obtains the minimum error among the comparison errors EfA, EfB, ..., and EfN obtained by Formula (10), and sets a virtual position having the minimum error as the current position. For example, when the minimum error calculated by the position correction means 211 is EfA, a current position 301(X, Y, Z) estimated by the current position estimation means 201 is set as a virtual position 302A (XA, YA, ZA) as in Formula (11).

$$X = XA$$
$$Y = YAZ = ZA \quad (11)$$

In addition, the position correction means 211 may correct a position based on the errors EfA, EfB, ..., and EfN obtained by Formula (10). For example, the current position 301 is calculated according to Formula (12).

$$X = (XA/EfA + ... + XN/EfN)/(1/EfA + ... + 1/EfN)$$
$$Y = (YA/EfA + ... + YN/EfN)/(1/EfA + ... + 1/EfN)$$
$$Z = (ZA/EfA + ... + ZN/EfN)/(1/EfA + ... + 1/EfN) \quad (12)$$

Hereinafter, examples of the present invention will be described with reference to FIGS. 7A and 7B.

Figure 7A:
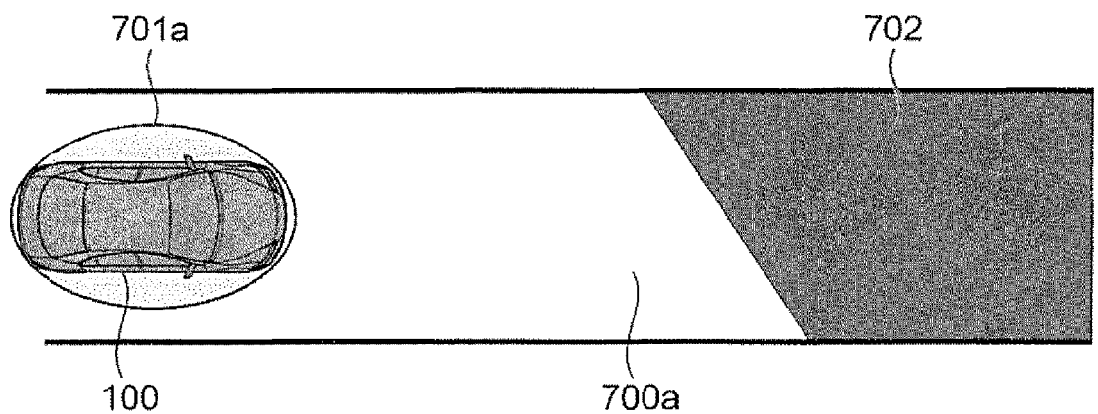
FIG. 7A is a view illustrating an example of the present invention.

A road 700a in FIG. 7A is a road on which moving object 100 is traveling. An error 701a is a current position error obtained by the current position error estimation means 210d. A shadow 702 is a shadow on the road 700 on which the moving object 100 is traveling. In order to describe the example, the following conditions (a1) to (f1) are used:

(a1) an error obtained by the imaging device calibration error estimation means 210a is large;

(b1) there are many feature points extracted by the feature point extraction means 210b;

(c1) a parallax image error obtained by the parallax image error estimation means 210c is small;

(d1) the current position error 701a estimated by the current position error estimation means 210d is small;

(e1) the number of pixels with a low intensity obtained by the image intensity acquisition means 210e is large due to the shadow 702; and (f1) an image resolution acquired by the image resolution acquisition means 210f is high.

According to the above conditions (a1) to (f1), since the error 701a estimated by the current position error estimation means 210d is small, the virtual position creation means 203 does not create a virtual position, and the environment information extraction means 202, the map reference 204, the virtual image creation 205, and the image matching 206 are performed only from a current position estimated by the current position estimation means 201. An average error is calculated by Formulas (6) and (7), and weights of a virtual image and a virtual distance image are calculated by Formulas (8) and (9). Here, since a calibration error of the imaging device 12a, the imaging device 12b, . . . , and the imaging device 12n obtained by the imaging device calibration error estimation means 210a is large, a weight of λc decreases. Since there are many dark pixels in the imaging device 12a, the imaging device 12b, . . . , and the imaging device 12n acquired by the image intensity acquisition means 210e due to the influence of the shadow 702, the weight λI decreases. However, the weight λr increases since each resolution of the imaging device 12a, the imaging device 12b, . . . , and the imaging device 12n obtained by the image resolution acquisition means 210f is high. The weight λs increased since an error obtained by the parallax image error estimation means 210c was small. Therefore, when the weight Wi of the virtual image and the weight Ws of the virtual distance image are calculated by Formulas (8) and (9), Wi<Ws.

Figure 7B:
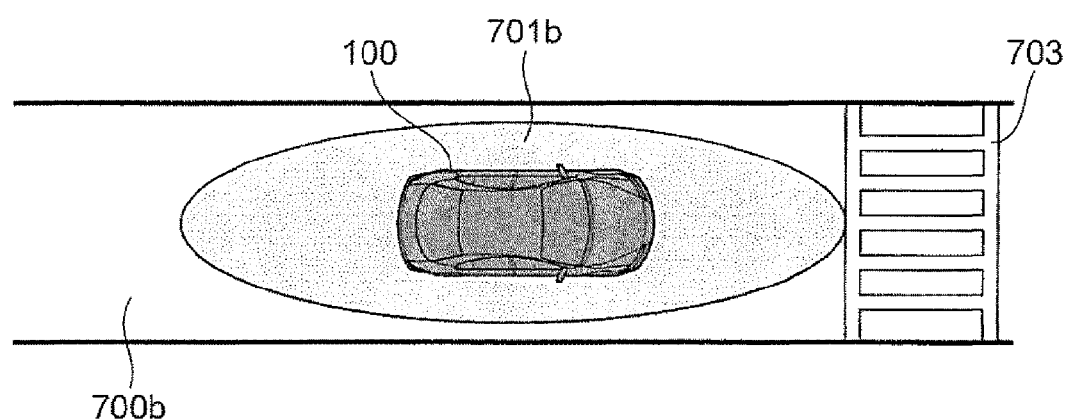
FIG. 7B is a view illustrating an example of the present invention.

On the other hand, in the case of FIG. 7B, there is a crosswalk 703 on a road 700b on which the moving object is traveling, and the current position error 701b estimated by the current position estimation means 201 is large.

Since the imaging device 12a, the imaging device 12b, . . . , and the imaging device 12n can be calibrated and corrected using the crosswalk 703:

(a2) a calibration error obtained by the imaging device calibration error estimation means 210a is small;

(b2) there are many feature points extracted by the feature point extraction means 210b;

(c2) a parallax image error obtained by the parallax image error estimation means 210c is large;

(d2) the current position error 701b estimated by the current position error estimation means 210d is large;

(e2) there are few pixels with a low intensity or pixels with a high intensity obtained by the image intensity acquisition means 210e since there are neither too bright pixels nor too dark pixels; and (f2) an image resolution acquired by image resolution acquisition means 210f is high.

According to the above conditions (a2) to (f2), in the case of FIG. 7B, the error 701b estimated by the current position error estimation means 210d is large, and thus, the virtual position creation means 203 creates a plurality of virtual positions, the map reference means 204 obtains map information from the respective virtual positions, and the virtual image creation means 205 creates virtual images from the respective virtual positions. Then, the virtual images created from the respective virtual positions are matched with an image actually acquired by the imaging device 12a, the imaging device 12b, . . . , and the imaging device 12n to calculate an error. Here, an average error is calculated by Formulas (6) and (7), and weights of a virtual image and a virtual distance image are calculated by Formulas (8) and (9).

In the case of FIG. 7B, since the imaging device 12a, the imaging device 12b, . . . , and the imaging device 12n can be calibrated and corrected using the crosswalk 703, the calibration error obtained by the imaging device calibration error estimation means 210a becomes smaller, and a weight of λc increases. Further, there are few pixels with a low intensity or pixels with a high intensity obtained by the image intensity acquisition means 210e, and thus, the weight λI increases. In addition, the image resolution acquired by the image resolution acquisition means 210f is high, and thus, the weight λr increases. On the other hand, since an error obtained by the parallax image error estimation means 210c at the time of creating a distance image was large, the weight λs decreased. Therefore, the weight Wi of the virtual image calculated by Formulas (8) and (9) is higher than the weight Ws of the virtual distance image (Wi>Ws).

Figure 8:
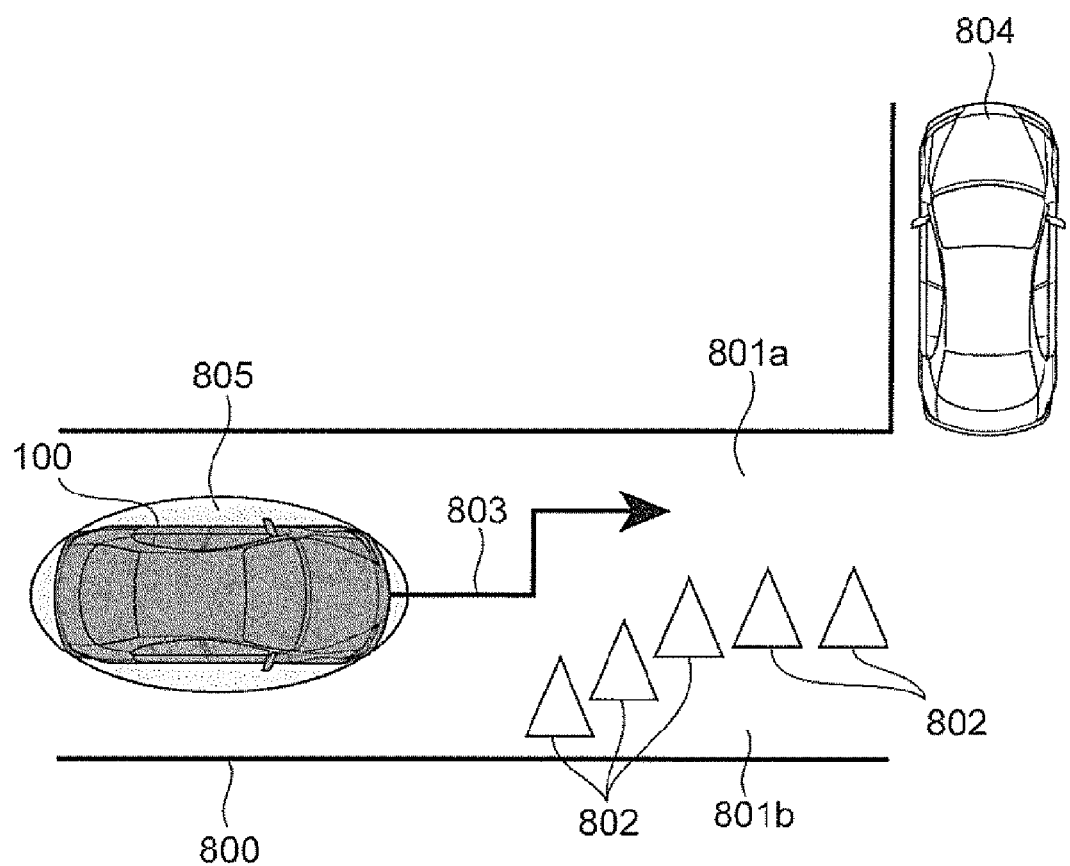
FIG. 8 is an illustration of an abnormal case.

FIG. 8 is a view illustrating an abnormal case. FIG. 8 illustrates a situation in which a lane is temporarily limited due to the influence of an accident or the like although travel on a road 800 is normally possible according to map information without limitation.

The road 800 is a road on which the moving object 100 is traveling. A travelable area 801a is an area on the road 800 where travel is possible. A travel-prohibited area 801b is an area on the road 800 where travel is temporarily prohibited. An obstacle 802 is an obstacle to distinguish the travel-prohibited area 801. A route 803 is a route created to avoid the obstacle 802. A moving object 804 is a preceding vehicle in the travelable area 801a. An estimated error 805 is an error estimated by the current position error estimation means 210d of the moving object 100.

When the moving object 100 is traveling on the road 800, the obstacle 802 is detected using the imaging device 12a, the imaging device 12b, . . . , and the imaging device 12n. At this time, the error 805 estimated by the current position error estimation means 210d of the moving object 100 is not large, but the travelable area 801a is narrower than the road 800 due to the obstacle 802. Therefore, it is necessary to perform traveling while accurately estimating a position as compared to the case of traveling on the normal road 800. Therefore, the number of virtual positions created by the virtual position creation means 203 and the number of virtual images created by the virtual image creation means 205 are increased. Then, after the moving object 100 travels in the travelable area 801a along the route 803, the width of the road 800 returns to the original width and becomes wider than that of the travelable area 801a. Therefore, a virtual position is created based on the error 805 estimated by the current position error estimation means 210d as usual.

Although it is assumed that the obstacle 802 is recognized by the imaging device 12a, the imaging device 12b, . . . , and the imaging device 12n for simplicity, the information of the obstacle 802 may be written on the map 19. For example, the moving object 804 may recognize the obstacle 802, describe the obstacle 802 immediately on the map 19, and share the obstacle 802 with another vehicle. Alternatively, the information of the obstacle 802 may be directly transmitted from the moving object 804 that has already traveled in the area 801a to the moving object 100 that is about to travel, using the vehicle-to-vehicle (V2V) technology without describing the obstacle 802 on the map 19. In addition, a command to increase the virtual position may be transmitted from the moving object 804 to the moving object 100 without transmitting the information of the obstacle 802 by the V2V technology.

Figure 9:
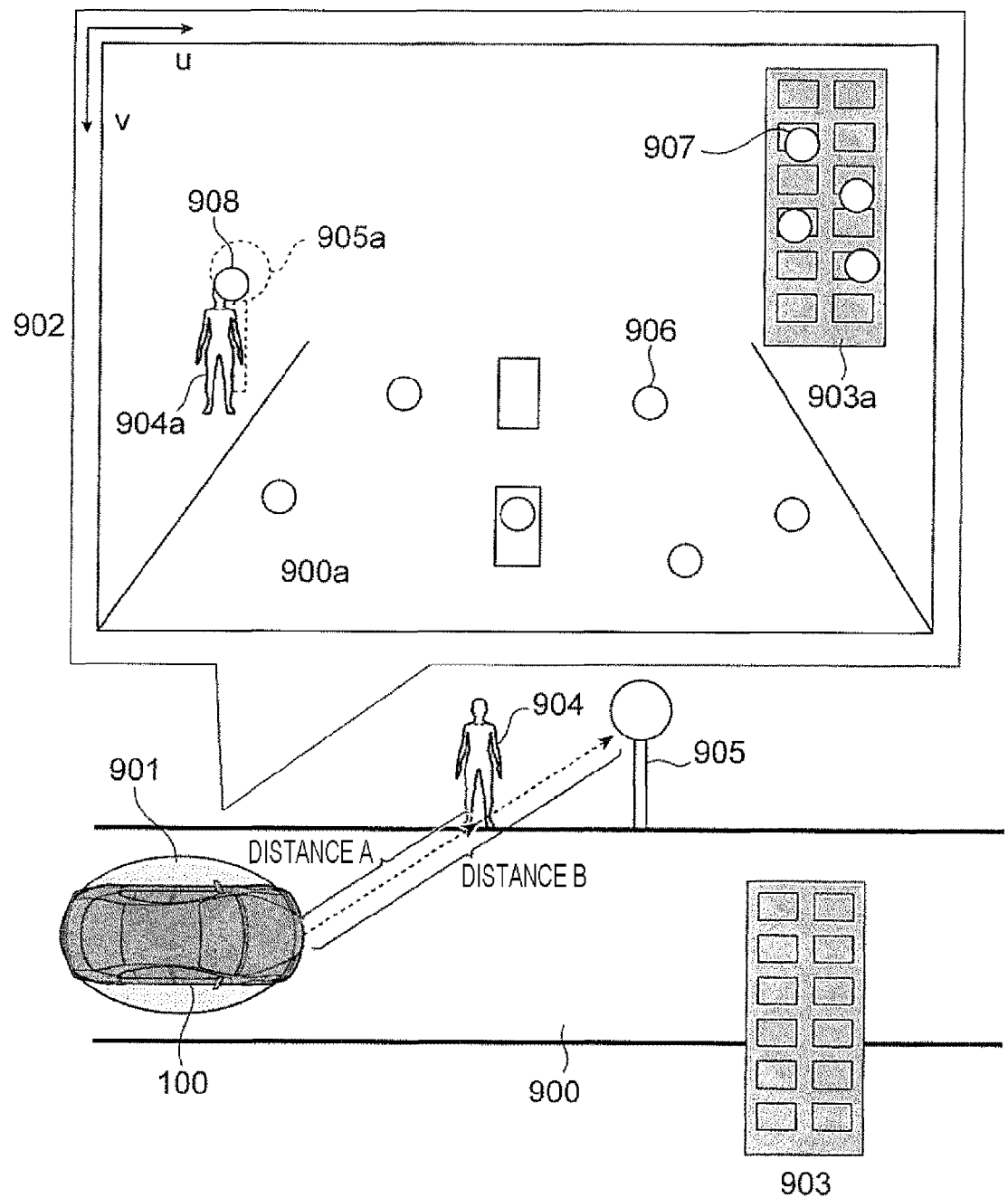
FIG. 9 is an illustration of influence of an obstacle and a countermeasure.

FIG. 9 illustrates influence of an obstacle and a countermeasure.

A road 900 is a road on which the moving object 100 is traveling. A position error 901 is a current position error of the moving object 100 estimated by the current position error estimation means 210d of the weighting means 210. An image 902 is an image acquired by the imaging device 12a, the imaging device 12b, . . . , and the imaging device 12n.

A stationary object 903 is a stationary object on the road 900, and is illustrated as a stationary object 903a on the image 902. An obstacle 904 is an obstacle on the road 900, and is illustrated as an obstacle 904a on the image 902. A stationary object 905 is a stationary object on the road 900, and is illustrated as a stationary object 905a on the image 902.

A point 906 is map information on the road 900 projected on the image 902. A point 907 is map information on the stationary object 903 projected on the image 902. A point 908 is map information on the stationary object 905 projected on the image 902. At this time, the obstacle 904a appears in front of the stationary object 905a. When information on the map 19 is given in the form of (x, y, z), pixel information of the point 908 is (u, v, distance A). However, an actual distance to the stationary object 905 detected by the imaging device 12a, the imaging device 12b, . . . , and the imaging device 12n is not the distance A but a distance B to the obstacle 904 in front of the stationary object 905. Therefore, a position error due to the position correction means 211 becomes large.

A countermeasure for avoiding the above-described position error due to the obstacle will be described. Matching is performed by distinguishing map information of an environment in which the moving object 100 is traveling. For example, since there is a high probability that another vehicle or a pedestrian exists on the road 900, the map information 906 on the road 900 is not used by the position correction means 211. In addition, since the map information on the stationary object 905 is highly likely to be affected by a surrounding obstacle, the map information 908 on the stationary object 905 is not used. Therefore, the position correction means 211 estimates a position using only map information of a certain level or higher based on the position estimated by the current position estimation means 201 of the moving object 100. Then, the position correction means 211 estimates the position only at the point 907 that is less likely to be affected by the obstacle, and thus, the influence of the obstacle on the environment in which the moving object 100 is traveling can be reduced.

In addition, not only the position estimation of the moving object 100 but also the position estimation and detection of the obstacle can be performed with the above-described countermeasure. For example, after highly accurate position estimation performed by the position correction means 211 only at the point 907, distances to the point 907 and the point 908 not used by the position correction means 211 are measured by the imaging device 12a, the imaging device 12b, . . . , and the imaging device 12n. Here, for example, the distance to the stationary object 905 based on the information on the map 19 is the distance B, but the actually measured distance becomes the distance A, and thus, it becomes clear that the point 908 on the image 902 is an outlier value or an obstacle. Therefore, each accuracy of the position estimated by the position correction means 211 only at the point 907 and the position of the obstacle 904 detected by using the point 908 increases.

Although the point 908 is described as a single point for simplicity, there may be a plurality of points.

In the case of the plurality of points, obstacle detection may be performed by comparing distances of the respective points and a distance measured from a position estimated by the position correction means 211 only at the point 907. In addition, the image 902 may be divided into various areas, and the point 908 within a certain area may be set as an obstacle. In addition, in order to improve the reliability, obstacle detection may be performed statistically by performing observation in a time-series manner without limiting to the map information 19 in the case of FIG. 9 and the information of the imaging device 12a, the imaging device 12b, . . . , and the imaging device 12n. In addition, obstacle detection is performed based on the current position error 901 of the moving object 100. For example, when the current position error 901 of the moving object 100 is low, the position correction means 211 estimates a position and determines whether or not there is an obstacle. On the other hand, when the current position error 901 of the moving object 100 is high, the position correction means 211 performs position estimation several times, and performs obstacle detection after the reliability becomes high.

The weight is calculated using the information on the current position error of the moving object 100 obtained by the current position estimation means, the information on the calibration error of the imaging device, which is the information acquired by the imaging device, the information on the feature point on the image extracted from the image captured by the imaging device, the information on the parallax image error acquired from the image captured by the imaging device, the information on the image intensity acquired from the image captured by the imaging device, and the information on the image resolution acquired from the image captured by the imaging device in the above-described embodiment, but may be calculated based at least one of these pieces of information.

According to the above-described embodiment, the process is performed in which the weight is calculated based on the information acquired by the imaging device 12 and the information on the current position error of the moving object 100 obtained by the current position estimation means, weighting is performed on the comparison errors calculated by comparing the plurality of virtual images and the actually captured image, and the virtual position having the smallest comparison error to be weighted is selected as the current position of the moving object 100 from among the plurality of virtual positions. The weight is not fixed as in the conventional case, but a value according to the situation is calculated, so that the reliability of the information becomes high, and highly accurate position estimation can be performed. Therefore, highly accurate matching is possible according to a traveling situation even in a situation where matching by images is difficult, for example, in a case where rain or sunlight is strong (backlight, shining, reflection) and a case where a calibration error of an imaging device is large.

As above, the embodiments of the present invention have been described in detail, but the present invention is not limited to the above-described embodiments, and various design modifications can be made without departing from the spirit of the present invention recited in the claims. For example, the above-described embodiments have been described in detail in order to describe the present invention in an easily understandable manner, and are not necessarily limited to one including the entire configuration that has been described above. In addition, configurations of another embodiment can be substituted for some configurations of a certain embodiment, and further, a configuration of another embodiment can be added to a configuration of a certain embodiment. Further, addition, deletion, or substitution of other configurations can be made with respect to some configurations of each embodiment.

REFERENCE SIGNS LIST 1 position estimation device
12 imaging device
13 information processing apparatus
14 image processing unit
15 control unit
16 memory
17 display unit
100 moving object

The invention claimed is:

1. A position estimation device configured to estimate a current position of a moving object equipped with an imaging device, comprising:
   at least one processor configured to:
      estimate the current position of the moving object;
      create a plurality of virtual positions based on the estimated current position;
      create each of a plurality of virtual images in a case of assuming that imaging is performed at the plurality of virtual positions by the imaging device, wherein only information within a predetermined threshold from the estimated current position is converted into a virtual image;
      compare the plurality of virtual images with an image captured at the current position by the imaging device to calculate each of comparison errors;
      calculate a weight based on at least one of information acquired by the imaging device or information on a current position error of the moving object obtained;
      weight each of the comparison errors using the weight; and
      correct the estimated current position based on each of the comparison errors to be weighted,
   wherein a number of the virtual positions and an interval from the estimated current position are adjusted based on the information on the current position error of the moving object,
   wherein the information acquired by the imaging device includes all of:
      information on a calibration error of the imaging device,
      information on a feature point on an image captured by the imaging device,
      information on a parallax image error when a parallax image is created from the image captured by the imaging device,
      information on an image intensity acquired from the image captured by the imaging device, and
      information on an image resolution acquired from the image captured by the imaging device.

2. The position estimation device according to claim 1, wherein
   the at least one processor is configured to set a virtual position for which the comparison error to be weighted is minimum among the plurality of virtual positions as the current position of the moving object.

3. The position estimation device according to claim 1, wherein
   an image resolution of the imaging device is changed based on the information on the current position error of the moving object.

* * * * *